Sept. 25, 1923.
D. KIENLE
WINDOW SEAT
Filed June 18, 1921
1,468,717
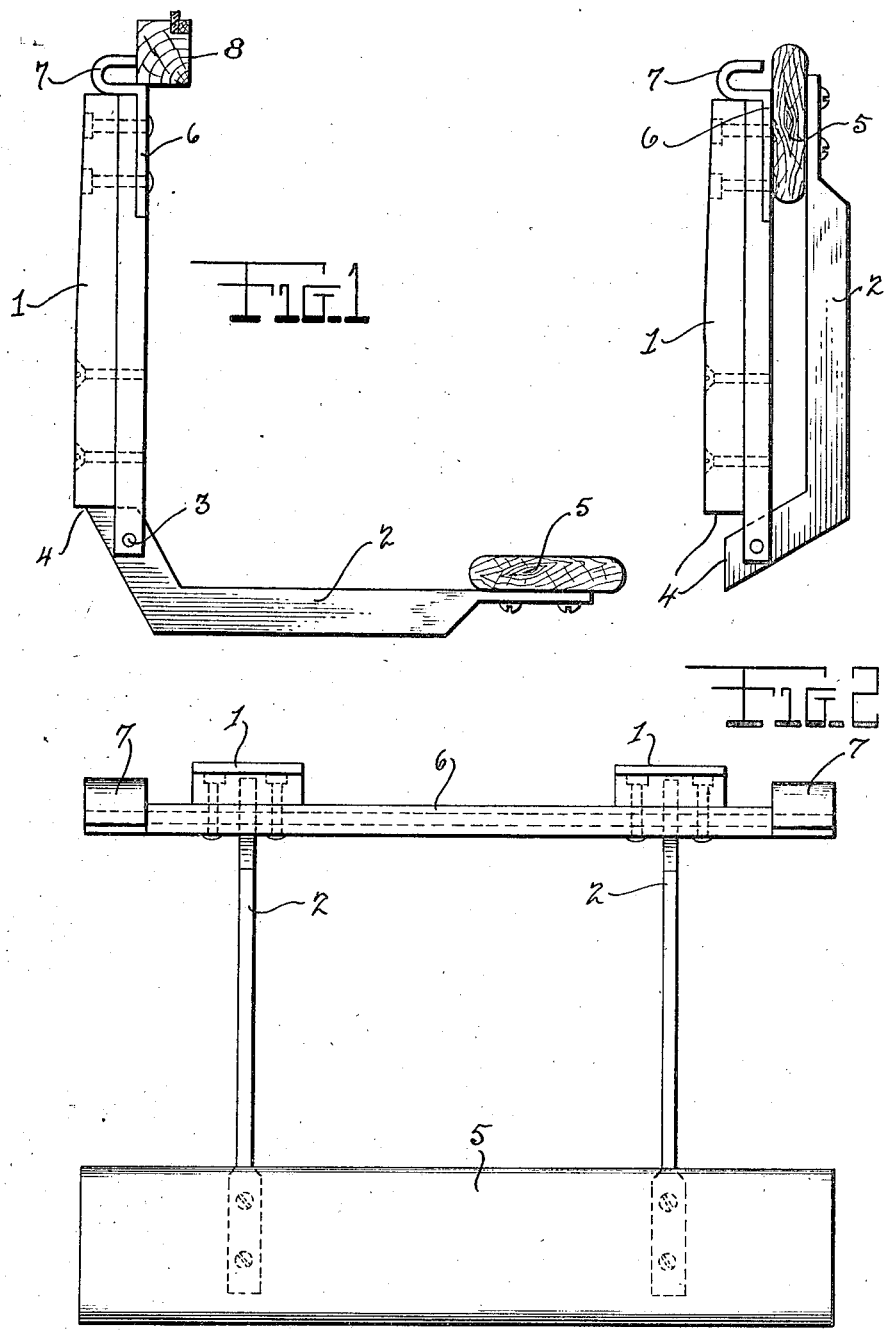
INVENTOR
D. Kienle
BY
J. Seden
ATTORNEY Patented Sept. 25, 1923.

1,468,717

UNITED STATES PATENT OFFICE.

DAVID KIENLE, OF JERSEY CITY, NEW JERSEY.

WINDOW SEAT.

Application filed June 18, 1921. Serial No. 478,500.

*To all whom it may concern:*

Be it known that I, DAVID KIENLE, a citizen of Germany, residing at Jersey City, in the county of Hudson and State of New Jersey, have invented certain new and useful Improvements in Window Seats, of which the following is a specification.

The main object of this invention is the provision of a window seat suitable for window cleaners and for workers repairing the outside of a building.

Another object of the invention is the provision of such a seat which is readily collapsible and removable, so that the same may be carried about and quickly attached or removed.

The above and other objects will become apparent in the description below, in which like-named characters of reference refer to like-named parts in the drawings.

Referring briefly to the drawings, Fig. 1 is a side elevational view of the device in extended position.

Fig. 2 is a side elevational view of the same collapsed.

Fig. 3 is a plan view of the same in extended position.

Referring in detail to the drawings, the numeral 1 represents one of the main members of the device and 2 the other, the former consisting of a pair of bars and the latter a pair of supports pivotally attached to the bars at 3. The ends of the bars 2 nearest the pivots 3 are bent at an angle to said bars, as shown, the extremities thereof being straight and square across to provide a shoulder adapted to engage the lower, straight angular ends of the members 1 so as to hold the members 2 at substantially right angles thereto when the device is extended, the contacting extremities being indicated at 4.

A seat 5 is secured to the outer ends of the bars 2, and a cross-bar 6 is secured to the outer extremities of the members 1. Grapple hooks 7 are provided on the ends of the bar 6, and are adapted to engage a bar or other support which, although not illustrated, may be attached between the opposite sides of the window frame. Or said hooks may engage the lower edge of the window 8, which may be slid down into such position as to allow this engagement. In this manner both the construction and the use of the device are simplified.

It is apparent from the drawings that the device may be quickly and simply collapsed and carried about, and extended and mounted in place as desired. It is also apparent, that the undersides of the members 2 rest upon the window sill when the device is in use, thus supporting it, and the engagement of the hooks 7 with the lower edge of the window, prevents turning of the device.

I claim:

A window seat comprising a pair of substantially straight rectangular support members having their level lower ends formed at right angles to their length, a bar fixed to said members extending outwardly beyond their sides and holding them in spaced relation, hooks fixed to the ends of said bar adapted to engage the sash of a window when lowered upon them, a seat element coincident in length with said bar, beams fixed to the lower surface of said seat element to extend towards support members, said beams having angularly upturned portions opposite said seat element, and pivots engaging said upturned beam portions to said support members, the ends of said upturned elements being adapted to make contact with the bottoms of said support members when said seat is turned outward, said beams being disposed parallel with said support members when said window seat is folded.

In witness whereof I affix my signature.

DAVID KIENLE.